United States Patent
Guo et al.

(10) Patent No.: US 9,712,310 B2
(45) Date of Patent: Jul. 18, 2017

(54) SYSTEM AND METHOD FOR CHANNEL QUALITY INDICATOR AND ACKNOWLEDGEMENT JOINT DETECTION

(71) Applicant: Futurewei Technologies, Inc., Plano, TX (US)

(72) Inventors: Yuanbin Guo, Mira Loma, CA (US); Junhong Nie, Mckinney, TX (US)

(73) Assignee: Futurewei Technologies, Inc., Plano, TX (US)

( * ) Notice: Subject to any disclaimer, the term of this patent is extended or adjusted under 35 U.S.C. 154(b) by 204 days.

(21) Appl. No.: 14/520,104

(22) Filed: Oct. 21, 2014

(65) Prior Publication Data

US 2015/0110050 A1   Apr. 23, 2015

Related U.S. Application Data

(60) Provisional application No. 61/894,796, filed on Oct. 23, 2013.

(51) Int. Cl.
*H04L 5/00* (2006.01)
*H04W 72/04* (2009.01)

(52) U.S. Cl.
CPC .......... *H04L 5/0055* (2013.01); *H04L 5/0057* (2013.01); *H04W 72/04* (2013.01)

(58) Field of Classification Search
CPC .................................. H04L 5/00; H04W 72/04
See application file for complete search history.

(56) References Cited

U.S. PATENT DOCUMENTS

| 8,264,992 B2* | 9/2012 | Earnshaw | H04W 28/06 370/310 |
| 8,953,532 B2* | 2/2015 | Liu | H04W 72/0413 370/329 |
| 8,971,248 B2* | 3/2015 | Han | H04L 1/1861 370/328 |
| 2004/0110473 A1* | 6/2004 | Rudolf | H04L 1/0026 455/69 |

(Continued)

OTHER PUBLICATIONS

Yow-Jong Liu, M. Wallace "A two-stage maximum likelihood sequence estimation technique and its application to data transmission protocol in digital cellular radio" Universal Personal Communications, 1992. ICUPC '92 Proceedings., 1st International Conference on Universal Personal Communications. pp. 11.05/1-11.05/5. Sep 29-Oct 1, 1992.*

*Primary Examiner* — Xavier Szewai Wong
(74) *Attorney, Agent, or Firm* — Slater Matsil, LLP (57) ABSTRACT

An embodiment method for network communications includes receiving, by a network device, a plurality of channel quality indicator (CQI) symbols and one or more acknowledgement (ACK) symbols and selecting a reduced set of candidate CQI symbols by comparing a plurality of candidate CQI symbols with the plurality of CQI symbols. The method further includes generating a plurality of candidate CQI and ACK symbol combinations by combining the reduced set of candidate CQI symbols with candidate ACK symbols. The network device detects the plurality of CQI symbols and the one or more ACK symbols by comparing the plurality of candidate CQI and ACK symbol combinations with the plurality of CQI symbols and the one or more ACK symbols.

22 Claims, 6 Drawing Sheets

(56) References Cited

U.S. PATENT DOCUMENTS

| | | | |
|---|---|---|---|
| 2009/0221289 A1* | 9/2009 | Xu | H04L 1/0023 455/435.1 |
| 2010/0177804 A1* | 7/2010 | Kwak | H04L 1/1861 375/141 |
| 2012/0213187 A1* | 8/2012 | Yang | H04L 1/0027 370/329 |
| 2013/0016687 A1* | 1/2013 | Yang | H04L 1/1614 370/329 |

* cited by examiner

SYSTEM AND METHOD FOR CHANNEL QUALITY INDICATOR AND ACKNOWLEDGEMENT JOINT DETECTION

PRIORITY CLAIM AND CROSS-REFERENCE

This application claims the benefit of U.S. Provisional Patent Application Ser. No. 61/894,796, filed on Oct. 23, 2013, and entitled "System and Method for CQI and ACK Joint Detection," which application is incorporated herein by reference in its entirety.

TECHNICAL FIELD

The present invention relates to a system and method for wireless communications, and, in particular embodiments, to a system and method for CQI and ACK joint detection.

BACKGROUND

The physical uplink control channel (PUCCH) in Long Term Evolution (LTE) carries important control information for the base station to perform upper layer scheduling for higher system capacity. As the standard evolves, LTE specifies PUCCH Format 2/2a/2b beyond Format 1 to carry both channel quality indicator (CQI) and acknowledgment (ACK) bits. CQI is an important parameter for link adaptation and represents the recommended modulation scheme and coding rate that should be used for the downlink transmission. ACK bits are essential for use of hybrid automatic repeat request (HARQ). Joint maximum likelihood detection (MLD) of CQI and ACK bits is desired because of its superior performance compared with a suboptimal detection method. However, the complexity of joint MLD grows exponentially with the number of CQI bits and ACK bits. It can be shown that the complexity is prohibitively high for real-time implementation in digital signal processing (DSP) despite its significant gain over a suboptimal detection method.

SUMMARY

These and other problems are generally solved or circumvented, and technical advantages are generally achieved, by embodiments which provide a system and method for channel quality indicator and acknowledgement joint detection.

In accordance with an embodiment, a method for network communications includes receiving, by a network device, a plurality of channel quality indicator (CQI) symbols and one or more acknowledgement (ACK) symbols and selecting a reduced set of candidate CQI symbols by comparing a plurality of candidate CQI symbols with the plurality of CQI symbols. The method further includes generating a plurality of candidate CQI and ACK symbol combinations by combining the reduced set of candidate CQI symbols with candidate ACK symbols. The network device detects the plurality of CQI symbols and the one or more ACK symbols by comparing the plurality of candidate CQI and ACK symbol combinations with the plurality of CQI symbols and the one or more ACK symbols.

In accordance with another embodiment, a network device includes a processor and a computer readable storage medium storing programming for execution by the processor. The programming including instructions to receive a plurality of channel quality indicator (CQI) symbols and one or more acknowledgement (ACK) symbols and select a reduced set of candidate CQI symbols by comparing a plurality of candidate CQI symbols with the plurality of CQI symbols. The programming includes further instructions to generate a plurality of candidate CQI and ACK symbol combinations by combining the reduced set of candidate CQI symbols with candidate ACK symbols. The plurality of CQI symbols and the one or more ACK symbols are detected by comparing the plurality of candidate CQI and ACK symbol combinations with the plurality of CQI symbols and the one or more ACK symbols.

In accordance with yet another embodiment, a method for network control channel element detection includes receiving, by a network device, a physical uplink control channel (PUCCH) having channel quality indicator (CQI) symbols and one or more acknowledgement (ACK) symbols. The network device detects CQI bits contained in the CQI symbols and ACK bits contained in the one or more ACK symbols using a two-stage maximum likelihood detection (MLD) method. The two-stage MLD method includes selecting, in a first stage of the two-stage MLD method, an M-list of candidate CQI symbols in accordance with a first metric and detecting, in a second stage of the two-stage MLD method, the CQI bits and the one or more ACK bits in accordance with a second metric. A first search space of the first stage includes only candidate CQI symbols, and a second search space of the second stage includes a plurality of candidate CQI and ACK symbol combinations. Each of the plurality of candidate CQI and ACK symbol combinations includes candidate CQI symbols from the M-list of candidate CQI symbols combined with a candidate ACK symbol.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments will be described in a specific context, namely an long term evolution (LTE) network using physical uplink control channel (PUCCH) Format 2a and/or 2b. Various embodiments, however, may be applied to other networks sending control information using other formats.

Generally, the performance of a PUCCH receiver (e.g., an LTE base station (BS)) plays a differentiating role in the LTE BS design because of the importance of the channel quality indicator (CQI) and acknowledgement (ACK) bits carried in the control channels. Although ACK bits are explicitly referenced for ease of description, it is appreciated that ACK bits may include ACK bits and/or negative ACK (NACK) bits as applicable. Theoretically, joint maximum-likelihood channel estimation and detection (MLD) of the CQI and ACK bits is the optimal detector for LTE PUCCH Formats 2x (e.g., Format 2a and 2b). However, the complexity of the joint MLD receiver grows exponentially with the number of CQI ($N_{CQI}$) bits and the number of ACK ($N_{ACK}$) bits. This makes joint MLD for a high number of CQI bits impractical for real-time implementation.

PUCCH processing in an LTE base station consumes a significant amount of digital signal processing (DSP) load in current and next-generation baseband system on a chip (SoC). Practically speaking, optimal, full search-space joint MLD generally cannot be enabled when the $N_{CQI}$ bits is greater than seven bits due to the exponential increase in complexity with respect to increased $N_{CQI}$ bits and $N_{ACK}$ bits. Even for a low to medium $N_{CQI}$ bits (e.g., between four and seven bits), the PUCCH receiver consumes a significant amount of DSP resources in current and next-generation baseband SoC. In a typical BS baseband implementation, it is shown that up to a significant amount of processing load is consumed by PUCCH receivers. However, a sub-optimal CQI/ACK detection method receiver has to be adopted for complexity issues and may suffer significant performance loss.

An embodiment provides staged M-list CQI and ACK MLD in LTE PUCCH Formats 2x (e.g., Format 2a or 2b). For example, an embodiment architecture and algorithm detects received CQI bits and ACK bits in two stages. In the first stage, an M-list of CQI candidates that best match (e.g., having the highest likelihood of matching) the received CQI bits is identified. Generally, M refers to the number of best CQI candidates identified, and the CQI candidates in the M-list of CQI candidates are referred to as M-list candidates. The first stage may select the M-list candidates by applying a metric measuring the degree the received CQI bits and candidate CQI bits match without accounting for the received ACK bits or ACK candidates. For example, the search space for the first stage is limited to CQI candidates, and only M highly matched CQI candidates are selected for evaluation in the second stage. In the second stage, the M-list candidates are combined with ACK candidates for joint detection of the received CQI bits and ACK bits.

An embodiment architecture and algorithm provide MLD of PUCCH Formats 2x with reduced complexity by reducing the search space of the two MLD stages. An embodiment not only reduces the search space size to a quarter of the original optimal solution for Format 2b, but also maintains the MLD performance with no or negligible detection performance loss. As a result, an embodiment receiver architecture can lead to fifty percent or more DSP load reduction in a vector DSP SoC implementation. The block error rate (BLER) performance approaches that of an optimal maximum likelihood receiver with a limited number (e.g., four or fewer) of M-list candidates while the complexity is reduced to a quarter of optimal solution through a two-stage divided CQI and ACK space detection. This saves a significant amount of DSP resources expended in CQI/ACK detection and also enables MLD performance for a higher $N_{CQI}$ bits (e.g., greater than seven).

Figure 1:
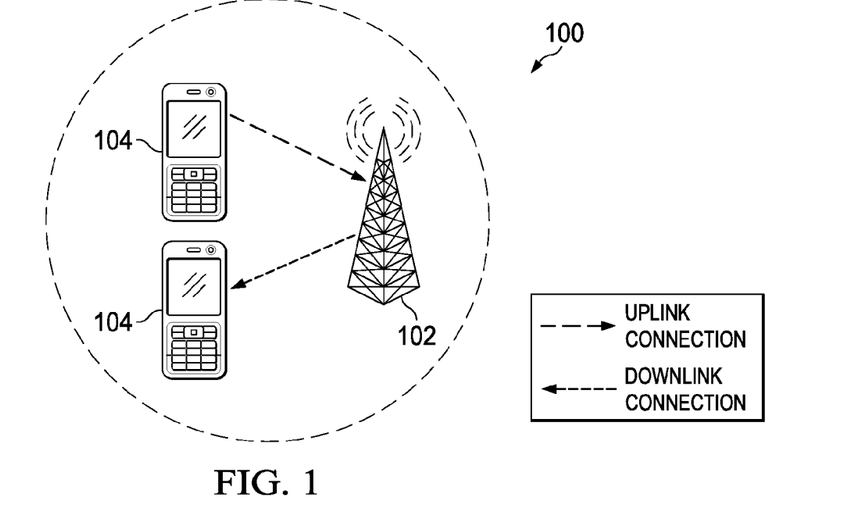
FIG. 1 illustrates a network in accordance with some embodiments.

FIG. 1 illustrates an example network in accordance with various embodiments. Typically, in a modern wireless communications system, such as a Third Generation Partnership Project (3GPP) Long Term Evolution (LTE) compliant communications system, a plurality of BSs (also commonly referred to as cells, NodeBs, evolved NodeBs (eNodeBs), base terminal stations, communications controllers, network controllers, controllers, access points (APs), and so on) may be arranged into a cluster of cells. Additionally, each BSs may be serving a number of user equipment (UEs) (also commonly referred to as mobile stations, users, subscribers, terminals, and so forth) based on a priority metric, such as fairness, proportional fairness, round robin, and the like, over a period of time. As shown in FIG. 1, in network 100, the transmission/reception from cell 102 to a UE 104 is called downlink (DL) transmission/reception, and the transmission/reception from UE 104 to cell 102 is called uplink (UL) transmission/reception. When a UE 104 enters network 100, BS 102 may configure UE 104 with various transmission formats. For example, BS 102 may specify which LTE Format 2x is used, and UEs 104 may then transmit uplink control information in a PUCCH during UL transmissions in accordance with the configured LTE Format 2x.

Figure 2:
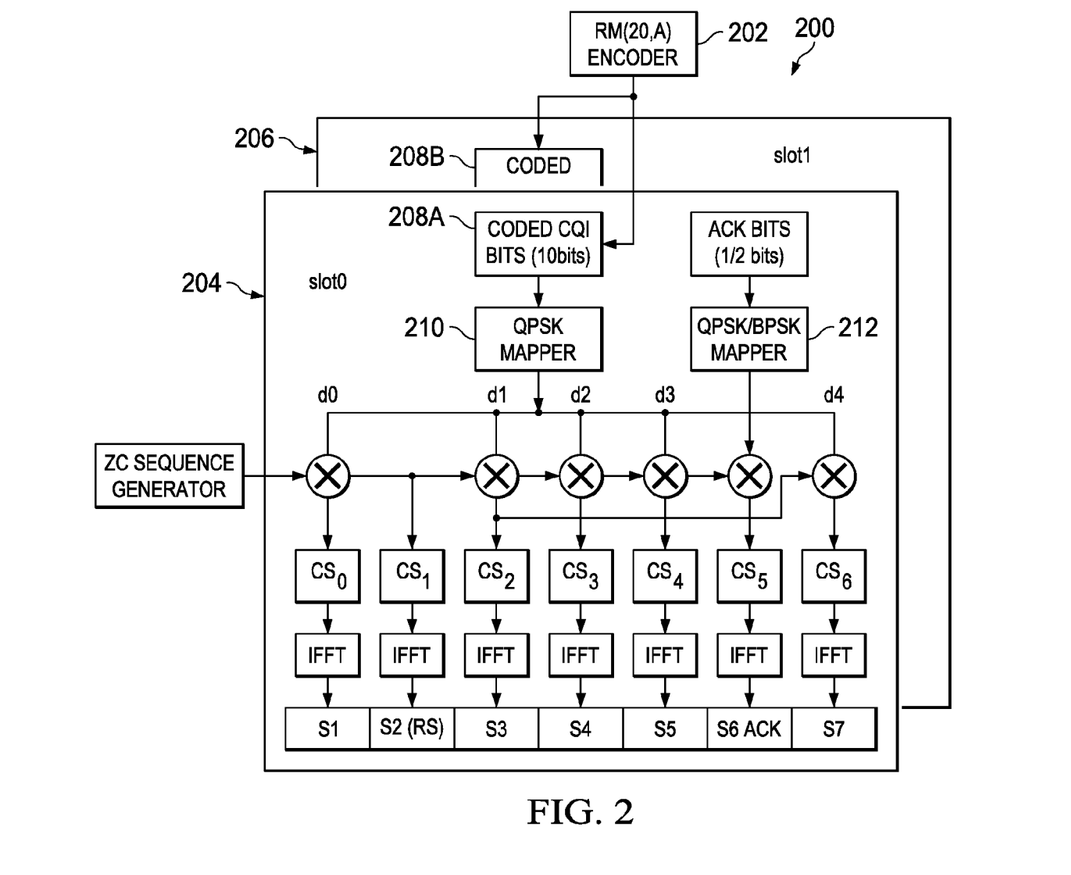
FIG. 2 illustrates a uplink transmission model for physical uplink control channel (PUCCH) Format 2x.

UL transmissions in network 100 from UE 104 may include an PUCCH according to an embodiment, which may be in accordance with LTE PUCCH Format 2x. FIG. 2 illustrates a transmission model 200 for the PUCCH Format 2x. Current LTE standards specify Formats 2, 2a, 2b where both CQI bits and ACK bits are transmitted within the same sub-frame. Under current standards, the $N_{CQI}$ bits may be four to eleven bits although embodiments may apply to a different $N_{CQI}$ bits (e.g., greater than eleven). These CQI bits are first coded with a Reed-Muller (20,A) (RM(20,A)) encoder 202 and scrambled to generate a twenty-bit codeword. These twenty bits are allocated to two slots 204 and 206 within a subframe. For example, each slot 204 and 206 may include ten coded CQI bits 208a and 208b, respectively, within a sub-frame. CQI bits 208a and 208b are quadrature phase shift keying (QPSK) modulated (e.g., by QPSK mapper 210) to generate five orthogonal frequency division multiplexing (OFDM) symbols, which are allocated to symbols (e.g., S1, S3, S4, S5, S7) in each slot 204 and 206. Furthermore, in each slot 204 and 206, symbol S2 is allocated for demodulation reference signal (DMRS) bits (or other pilot bits) and symbol S6 is allocated to either DMRS or ACK symbols depending on the actual PUCCH format used For example, Format 2b generally includes two ACK bits modulated in QPSK while Format 2a will carry one ACK bit modulated in binary PSK (BPSK). The ACK bits may be modulated by QPSK/BPSK mapper 212. These symbols are multiplexed to form an OFDM subframe and sent to a PUCCH transmitter (e.g., UE 104) for transmission to a PUCCH receiver (e.g., BS 102).

Figure 3:
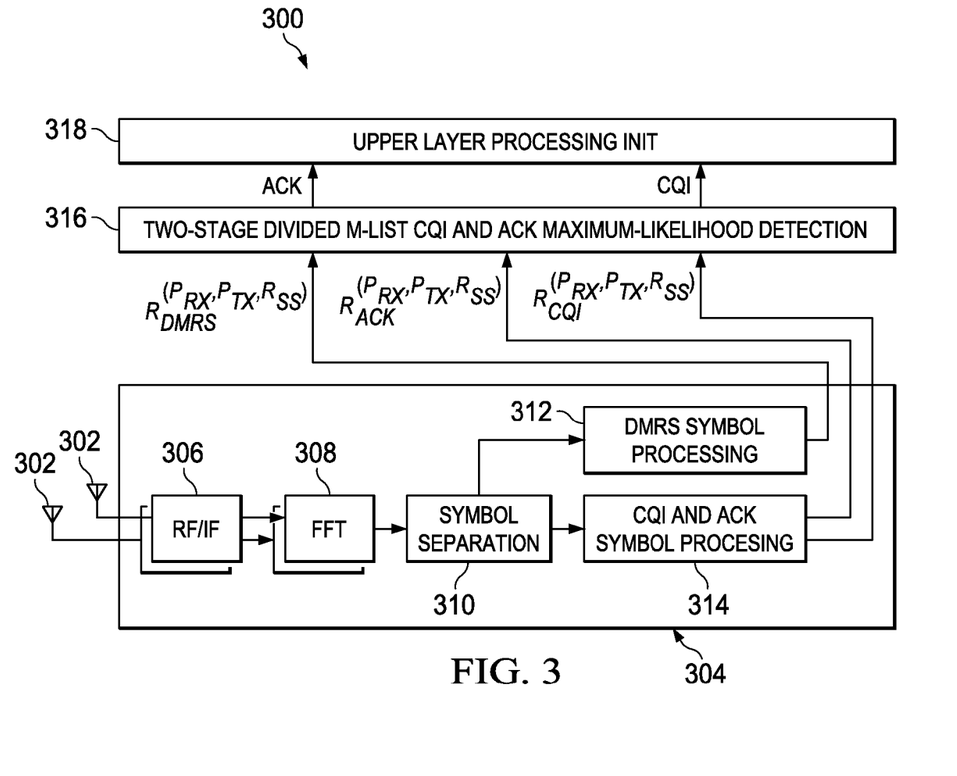
FIG. 3 illustrates an embodiment two-stage divided M-list CQI and ACK maximum-likelihood detector architecture.

An embodiment provides a low complexity receiver architecture to achieve two-stage MLD detection. FIG. 3 illustrates a top level architecture 300 of a PUCCH Format 2x receiver (e.g., BS 102). BS 102 may include antennas 302, which receive the PUCCH from various UL transmitters (e.g., UEs 104) within a cell. Generally, the PUCCH may include uplink control information (e.g., CQI, ACK, and pilot data) from multiple UEs 104, which may be multiplexed together. Various modules in a front-end processing unit 304 process the received PUCCH. For example, front-end processing unit 304 may include a RF/IF module 306, enhanced fast Fourier transform (FFT) processor 308, symbol separation processor 310, and other functions. RF/IF module 306 converts the radio signal into a baseband signal. The enhanced FFT processor 308 translates the time-domain baseband signal into a frequency domain signal. The enhanced FFT processor 308 may further contain functionalities to separate uplink control data from other uplink user data (e.g., physical uplink shared channel (PUSCH)) and further may separate data from different UEs (e.g., based on UE-specific sequences) sharing the same frequency resource.

The PUCCH frequency data from each UE after enhanced FFT are then separated into individual symbols (e.g., by symbol separation processor 310) and split into DRMS symbol and CQI/ACK symbols by DMRS symbol processor 312 and CQI/ACK symbol processor 314, respectively. DRMS, CQI, and ACK symbols may be extracted and split based on the format of the received PUCCH. For example, as discussed above, in LTE Format 2x, symbols S1, S3 S4, S5, and S7 include CQI bits, symbol S2 includes DRMS bits, and symbol S6 includes either ACK bits or DRMS bits. Thus, front end processing unit 304 may determine which symbols contain DRMS bits, CQI bits, and ACK bits based on their location within the a received PUCCH slot. Other receiver functionalities may also be applied to the various received data symbols. Subsequently, an embodiment detects the received CQI bits and ACK bits after pre-processing in a two-stage divided M-list CQI and ACK joint MLD module 316. Two-stage MLD module 316 detects both the CQI and ACK bits based on a pre-defined metric and transmits the detected CQI bits and ACK bits to upper layer processing units 318 for scheduling, link adaptation, hybrid automatic repeat request (HARQ), and the like.

Figure 4:
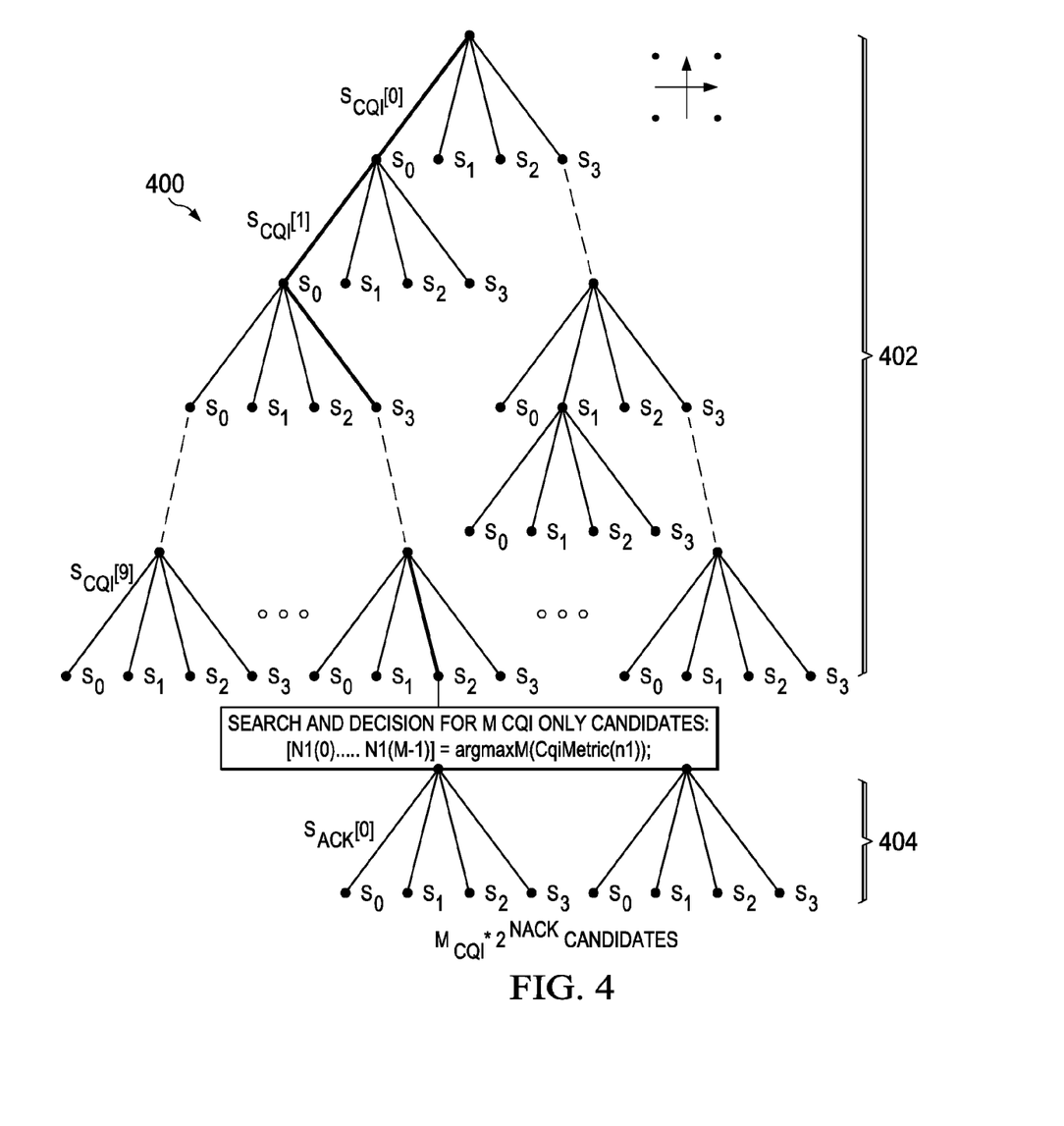
FIG. 4 illustrates operation of an embodiment two-stage divided M-list CQI and ACK maximum likelihood detection (MLD)

In an embodiment, two-stage divided M-list CQI and ACK MLD detector module 316 detects CQI bits and ACK bits in two-stages for reduced detection complexity. For example, FIG. 4 illustrates an example two-stage decision tree 400 for detection of CQI bits and ACK bits. In stage 1 (portion 402), only CQI symbols (e.g., $S_{CQI}[0]$ through $S_{CQI}[9]$) without ACK symbols are used for a sub-space MLD detection according to the metric:

$$CqiMetric_{n_1} = \sum_{p=0}^{N_{Rx},N_{TX}} \sum_{n_{ss}=0}^{1} F\left[R_{DMRS}^{(p_{Rx},p_{Tx},n_{ss})}, R_{CQI}^{(p_{Rx},p_{Tx},n_{ss})}, S_{CQI}^{n_{ss}}(n_1)\right];$$

$$n_1 = [0, 2^{Ncqi} - 1]$$

$$\text{Mlist\_CQI\_det: } \hat{n}_1([1 \sim M]) = \underset{n_1}{\operatorname{argmax}}\{CqiMetric_{n_1}\}$$

where $R_{DMRS}^{(p_{Rx},p_{Tx},n_{ss})}$ and $R_{CQI}^{(p_{Rx},p_{Tx},n_{ss})}$ are the pre-processed symbol values of received DMRS and CQI, respectively, in a slot $n_{xx}$ for an antenna pair ($P_{RX}$, $P_{TX}$) provided to two-stage MLD module 316 by front end processing unit 304 (see FIG. 3). The second line in the above equation indicates choosing M best matching candidates from the larger set of possible CQI candidates (e.g., $2^{Ncqi}$ possible CQI candidates). Generally, the received pilot symbol(s) $R_{DMRS}^{(p_{Rx},p_{Tx},n_{ss})}$ is known to two-stage MLD module 316 and may be included in the above metric for improved accuracy in identifying received CQI symbols $R_{CQI}^{(p_{Rx},p_{Tx},n_{ss})}$. Antenna $P_{RX}$ may be a receiving antenna 302 at BS 102 whereas antenna $P_{TX}$ may be a transmitting antenna at a PUCCH transmitter (e.g., UE 104).

$S_{CQI,}^{n_{ss}}(n_1)$ are the candidate CQI symbols, which may be processed, by the PUCCH receiver (e.g., BS 102), in accordance with PUCCH Format 2x in a similar manner as received CQI symbols $R_{CQI}^{(p_{Rx},p_{Tx},n_{ss})}$ and $n_1$ designates a candidate index for a candidate CQI symbol. In an embodiment, the PUUCH receiver (e.g., two-stage MLD module 316) may generate a set of candidate CQI bits (e.g., all possible binary combinations for CQI), which may be based on the $N_{CQI}$ bits transmitted. For example, when the $N_{CQI}$ bits equals seven, the set of candidate CQI bits may be [0000000, 0000001, 0000010, 0000011, . . . 1111110, and 1111111]. The set of candidate CQI bits may then be processed in a similar manner as the received CQI symbols $R_{CQI}^{(p_{Rx},p_{Tx},n_{ss})}$ were processed (e.g., as illustrated by transmission model 200). For example, the candidate CQI bits may be encoded into a twenty-bit codeword according to RM(20,A) and QPSK modulated into candidate CQI symbols $S_{CQI,}^{n_{ss}}(n_1)$. Thus, candidate CQI symbols $S_{CQI,}^{n_{ss}}(n_1)$ may be generated from the set of candidate CQI bits. In various embodiments, the number of $S_{CQI,}^{n_{ss}}(n_1)$, which may correspond to a size of the search space in stage 1, may equal $(2^{Ncqi}-1)$. In such embodiments, the candidate CQI search space of stage 1 is constrained by the RM(20,A) encoder to be $(2^{Ncqi}-1)$, instead of the full symbol level space size of $2^{20}$.

In the above equation, F[.] is a predefined metric measuring how close a candidate CQI symbol (e.g., each candidate CQI symbols $SC_{CQI,}^{n_{ss}}(n_1)$) is to received CQI symbols $R_{CQI}^{(p_{Rx},p_{Tx},n_{ss})}$ from the PUCCH transmitter (e.g., UE 104). For example, $R_{DMRS}^{(p_{Rx},p_{Tx},n_{ss})}$ and $S_{CQI,}^{n_{ss}}(n_1)$ may be processed according to a predefined transmission model and the result may be compared to the received transmission, which may be function of $R_{DMRS}^{(p_{Rx},p_{Tx},n_{ss})}$ and $R_{CQI}^{(p_{Rx},p_{Tx},n_{ss})}$. The calculated metric for each candidate CQI symbol $S_{CQI,}^{n_{ss}}(n_1)$ may be combined. For example, a graph may be generated mapping candidate CQI symbols $S_{CQI,}^{n_{ss}}(n_1)$ along the x-axis and the metric F[.] along the y-axis. A reduced set of candidate CQI symbols (referred to as an M-list of candidate CQI symbols) is selected based on the combined metrics. The M-list of candidate CQI symbols include candidate CQI symbols $S_{CQI,}^{n_{ss}}(n_1)$ having the best matches to received CQI symbols $R_{CQI}^{(p_{Rx},p_{Tx},n_{ss})}$, and candidate CQI symbols in the M-list may be referred to as the M-list candidates. For example, M-list candidates may be chosen corresponding to M highest peaks in the metric distribution graph.

Thus, stage 1 (illustrated by decision tree portion 402) outputs a reduced set of M candidate CQI bit sequences by using an M-list selector based on a predefined metric. M is the number of candidate CQI symbols $S_{CQI,}^{n_{m}}(n_1)$ identified using the above metric. It is noted that in various embodiments, lowering complexity of MLD (e.g., by limiting the value of M) is balanced against accurately detecting transmitted CQI and ACK bits. For example, in practice, the received PUCCH is also a function of the received ACK symbol(s), which is not accounted for in stage 1 (tree portion 402) of the two-stage MLD method. In some embodiments, the candidate CQI symbol $S_{CQI,}^{n_{ss}}(n_1)$ having the best match using metric F[.] (e.g., without accounting for preprocessed received ACK symbols $R_{ACK}^{(p_{Rx},p_{Tx},n_{ss})}$) may not be the transmitted CQI symbol. Thus, additional candidate CQI symbols $S_{CQI,}^{n_{ss}}(n_1)$ (e.g., in addition to the best match) may be included in the M-list candidates for evaluation in stage two (illustrated by decision tree portion 404) of two-stage divided M-list CQI and ACK MLD detection as explained in greater detail below. In some embodiments, the value of M may be four or fewer to maintain the complexity of two-stage divided M-list CQI and ACK MLD detection at a manageable level with negligible performance loss.

In stage 2 (portion 404 of FIG. 4), M-list candidates from the CQI-only MLD metric of stage one is combined with all ACK candidate symbols to perform M-list CQI and ACK joint MLD to detect received CQI and ACK bits in accordance with the following:

$$MCqiAckMetric_{\hat{n}_1([1:M],n2)} =$$

$$\sum_{p=0}^{N_{Rx},N_{TX}} \sum_{n_{ss}=0}^{1} F\left[R_{DMRS}^{(p_{Rx},p_{Tx},n_{ss})}, R_{CQI,1\sim M}^{(p_{Rx},p_{Tx},n_{ss})}, R_{ACK}^{(p_{Rx},p_{Tx},n_{ss})},\right.$$

$$\left. S_{CQI,1\sim M}^{n_{ss}}(\hat{n}_1([1:M]), S_{ACK}^{n_2}(n_2)\right],$$

$$n_2 = [0, 2^{Nack} - 1],$$

$$CQI, ACK \text{ bits: } [\hat{n}_1, \hat{n}_2] = \underset{\hat{n}_1([1:M]),n_2}{\operatorname{argmax}} \left(MCqiAckMetric_{\hat{n}_1([1:M],n2)}\right)$$

where $R_{ACK}^{(p_{Rx},p_{Tx},n_{ss})}$ is the pre-processed symbol values of received ACK symbols in a slot $n_{ss}$ for an antenna pair ($P_{RX}$, $P_{TX}$) provided to two-stage MLD module 316 from front end processing unit 304 (see FIG. 3). $S_{ACK}^{n_2}(n_2)$ are candidate ACK symbols, and $S_{CQI,0\sim M}^{n_{ss}}(\hat{n}_1([1:M])$ represents the M-list candidates. Candidate ACK symbols $S_{ACK}^{n_2}(n_2)$ may be generated, by the PUCCH receiver, in a similar manner as received ACK symbols. For example, the PUCCH receiver may generate set of candidate ACK bits based on the $N_{ACK}$ bits. In embodiments where $N_{ACK}$ equals two (as configured by LTE PUCCH Format 2b), the set of candidate ACK bits is [00, 01, 10, and 11]. The set of candidate ACK bits may then be QPSK or BPSK modulated into candidate ACK symbols $S_{ACK}^{n_2}(n_2)$.

The combined search space size for both stages of the two-stage MLD model is thus $2^{Ncqi}+M*2^{Nack}$, which is linear with respect to M and smaller than the search space size (e.g., $2^{Ncqi+Nack}-1$) of joint MLD models (e.g., models where ACK and CQI bits are detected in one stage simultaneously). For example, in LTE PUCCH Format 2b, $N_{ACK}$ equals two. Thus, the final search space size utilizing a two-stage MLD model is $2^{Ncqi}+4M$ as opposed to the search space size of an joint MLD model being $4(2^{Ncqi})-1$. This effectively reduces the search space of the two-stage MLD model to about ¼ of joint MLD models. Note that even in embodiments where M is large (e.g., greater than four), the increase to search space size complexity is linear, not exponential. In various embodiments, the predefined metric F[.] used in both stage 402 and 404 may be similar. For example, candidate CQI and ACK symbol combinations may be graphed with respect to the above metric (e.g., F[.] value), and best combination of CQI/ACK candidate bits may be selected based on the generated metric distribution, for example.

Figure 5:
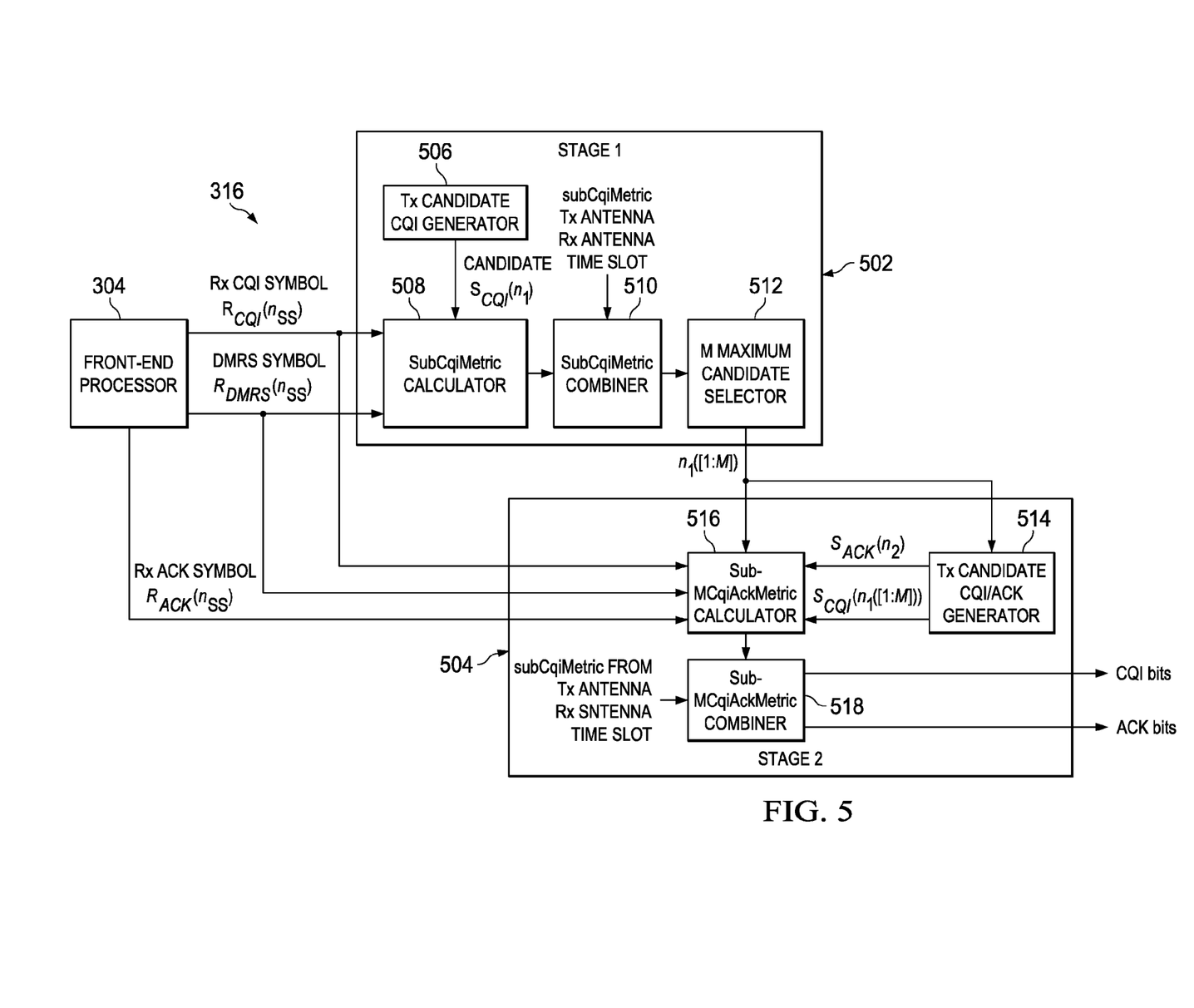
FIG. 5 illustrates a receiver architecture for an embodiment two-stage divided M-list CQI and ACK MLD detector.

FIG. 5 shows a block diagram for an embodiment two-stage MLD module 316. There can be different implementation architectures for the proposed receiver depending on how the metric is defined and implemented. FIG. 5 shows one of the implementation options. Two-stage MLD module 316 includes a stage one module 502 and a stage two module 504 for implementing the two-stage MLD detector model described above. In the illustrated embodiment, front-end processor 304 provides pre-processed received DMRS symbols $R_{DMRS}^{(p_{Rx},p_{Tx},n_{ss})}$ and CQI symbols $R_{CQI}^{(p_{Rx},p_{Tx},n_{ss})}$ to stage one module 502 and stage two module 504. Pre-processed received ACK symbols $R_{ACK}^{(p_{Rx},p_{Tx},n_{ss})}$ may be provided only to stage two module 504 because received ACK symbols $R_{ACK}^{(p_{Rx},p_{Tx},n_{ss})}$ are not used in stage one detection of the two-stage MLD detector model described above.

In stage one module 502, candidate CQI symbols $S_{CQI}^{n_{ss}}(n_1)$ are generated by a transmission candidate CQI symbol generator 506, which may include a RM encoder and a QPSK mapper. Candidate CQI generator 506 may generate candidate CQI symbols from candidate CQI bits as described above. These candidate CQI symbols for the whole subframe are used to build a metric with the pre-processed DMRS symbols $R_{DMRS}^{(p_{Rx},p_{Tx},n_{ss})}$ and CQI symbols $R_{CQI}^{(p_{Rx},p_{Tx},n_{ss})}$ metric calculator 508. For example $R_{DMRS}^{(p_{Rx},p_{Tx},n_{ss})}$, $R_{CQI}^{(p_{Rx},p_{Tx},n_{ss})}$, and $S_{CQI}^{n_{ss}}(n_1)$ are compared and mapped according to a predefined metric F[.]. Alternatively, CQI candidate symbol $S_{CQI}^{n_{ss}}(n_1)$ may not be explicitly generated but implicitly embedded in the metric calculation (e.g., included in the calculation of F[.]). In such embodiments, candidate CQI generator 506 may be excluded, and a set of candidate CQI bits may be used as a variable in the metric (e.g., F[.]) instead of candidate CQI symbols $S_{CQI}^{n_{ss}}(n_1)$.

Metric combining is performed by SubCQI metric combiner 510 with respect to the Tx antenna, Rx antenna, and time slots. This is looped over all the CQI candidates (e.g., $2^{ncqi}$ CQI candidates) to compute all the possible metrics $$\sum_{p=0}^{N_{Rx},N_{TX}} \sum_{n_{ss}=0}^{1} F(\cdot).$$

The metrics are then passed to an M-list candidate selector 512 to select the M top candidates that maximizes the metric. For example, the metrics may be graphed and the M best candidate CQI symbols (or bits) may be selected based on M peaks in the mapped distribution. In various embodiments, the value of M may account for reduced complexity while maintaining a negligible detection performance. For example, in some embodiments, M may equal four or less.

In the second stage (e.g., stage two module 504), the M-list candidates are combined with ACK candidates for a joint detection of CQI and ACK bits. The search space for stage two module 504 may be M times the number of ACK candidates (e.g., $M2^{Nack}$). A candidate CQI/ACK generator 514 may generate candidate CQI/ACK combinations by combining candidate CQI symbols (or bits) from the M-list candidates with all possible candidate ACK symbols (or bits). In some embodiments, candidate CQI/ACK generator 514 may process candidate ACK bits into ACK symbols as described above using a QPSK mapper and/or BPSK mapper. Alternatively, M-list candidates bits may be directly combined with candidate ACK bits, and the symbol generation of corresponding bits may be embedded in the matric calculation (e.g., included in the calculation of F[.]), These candidate CQI/ACK combinations for the whole subframe are used to build a metric with the pre-processed DMRS symbols $R_{DMRS}^{(p_{Rx},p_{Tx},n_{ss})}$, CQI symbols $R_{CQI}^{(p_{Rx},p_{Tx},n_{ss})}$, and ACK symbols $R_{ACK}^{(p_{Rx},p_{Tx},n_{ss})}$ by Sub-$M_{CQI}$ACK metric calculator 516. For example, $R_{DMRS}^{(p_{Rx},p_{Tx},n_{ss})}$, $R_{CQI}^{(p_{Rx},p_{Tx},n_{ss})}$, $R_{ACK}^{(p_{Rx},p_{Tx},n_{ss})}$, and the candidate CQI/ACK combinations are compared and mapped according to a predefined metric F[.]. Metric combining is performed by Sub-$M_{CQI}$ACK metric combiner 518 with respect to the Tx antenna, Rx antenna, and time slots. This is looped over all the $M2^{Nack}$ candidates to compute all the possible metrics. The maximized metric is then identified to detect the CQI/ACK bits transmitted in PUCCH. Thus CQI bits and ACK bits may be detected using two-stage MLD module 314.

It has been observed that by detecting CQI bits and ACK bits in two separate stages as opposed to joint MLD models, DSP load and complexity may be reduced with negligible performance loss. For example, in some experiments, DPS load may be reduced by up to about 60% with less than 0.05 decibels (dB) loss in performance when M equals two. The reduction in DPS load may be factor of the value of M. For example, it has been observed that cycle count is reduced to about 40% to about 43% of joint MLD methods in embodiments using two-stage MLD methods when M equals two, and it has also been observed that cycle count is reduced to about 43% to about 53% of joint MLD methods in embodiments using two-stage MLD methods when M equals four with negligible loss.

Figure 6:
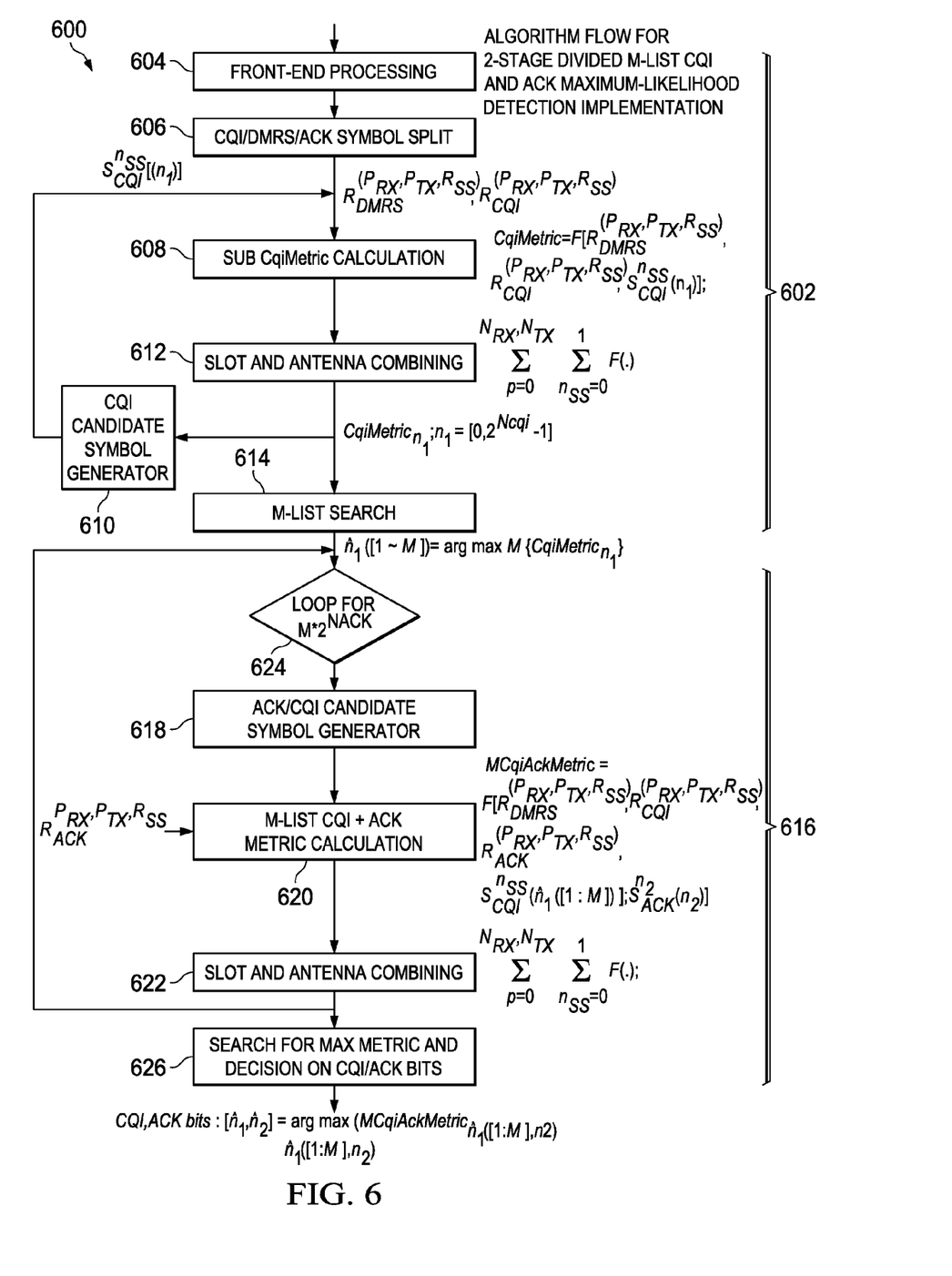
FIG. 6 illustrates a flow chart for a two-stage divided MLD implementation.

FIG. 6 illustrates process flow 600 a flow chart for two-stage MLD detection by a PUCCH receiver (e.g., BS 102). In the first stage (portion 602), a reduced set of candidate CQI symbols (referred to as an M-list of CQI symbols) are selected from all possible candidate CQI symbols. The first stage begins with a received PUCCH undergoing pre-processing (step 604) and symbol separation (step 606) as described above to identify pre-processed received DRMS symbols (e.g., $R_{DMRS}^{(pRx,pTx,n_{ss})}$) and CQI symbols (e.g., $R_{CQI}^{(pRx,pTx,n_{ss})}$). In step 608, a first metric is calculated on the basis of CQI symbols (both received and candidate CQI symbols) and DRMS symbols without ACK symbols. The first metric measures how close each candidate CQI symbol is to the transmitted symbols from the UE. The candidate CQI symbols can be generated in two ways: explicitly by a RM encoder and QPSK mapping (e.g., in optional step 610) or implicitly embedded in the metric equation. The metric values of each candidate CQI symbol are combined in step 612 with respect to all Tx antennas, Rx antennas, and time slots. Then in step 614, M CQI candidates that maximize the metric are selected. The first stage generates an M-list of CQI candidates, which identifies M best CQI candidates based on the first metric.

In the second stage (portion 616), a second metric is built on the basis of the selected M-list candidates from the first stage combined with ACK/NACK symbols. In step 618, candidate CQI/ACK combinations are generated by combining the M-list candidates from stage 1 with all candidate ACK symbols. The candidate ACK symbols can be generated in two ways: explicitly by QPSK/BPSK mapping or implicitly embedded in the metric equation. In step 620, a second metric calculating how close a candidate combination (e.g., candidate CQI and candidate ACK) is to the transmitted symbols from the UE is generated for each candidate CQI/ACK combination. In step 622, the metric values of each candidate CQI/ACK combination are combined with respect to all Tx antennas, Rx antennas, and time slots. In the illustrated process, the combination is calculated over a loop $M2^{Nack}$ (loop 624). Finally, the candidate CQI/ACK combination that maximizes the metric is identified (step 626) as the received CQI bit and ACK bit, which may be used, by the BS, for scheduling, link adaptation, HARQ, and the like.

An embodiment provides a reduced complexity receiving architecture for LTE PUCCH Format 2a/2b. It divides CQI and ACK joint MLD space into 2-stage divided CQI-only and ACK detection. An embodiment has a two stage receiver architecture with a two stage receiver algorithm flow. There are two separated metrics in stage 1 and stage 2. The two metrics are operated on in a cascade manner in stage 1 and stage 2. The construction of the second metric depends on the outcome of the first stage operation.

An embodiment keeps configurable M candidates CQI-only detection in stage 1. The metric in stage 1 is built on the basis of CQI QPSK symbols. It measures how close CQI candidates are to transmitted CQI symbols from the UE. The candidate CQI symbols can be generated in two ways, either explicitly by RM encoder and QPSK mapping, or implicitly embedded in the metric equation. The M most-favorable candidates are chosen corresponding to the M largest metric in stage 1.

An embodiment performs joint CQI and ACK detection in stage 2 with a much smaller search space. The second metric is built on the basis of the selected M candidate CQI symbols from the first stage combined with candidate ACK/NACK symbols. It measures how close the selected candidate combination (CQI and ACK) is to the transmitted symbols. The number of candidates in the second stage is linear in M resulting from the first stage operation. The UE-transmitted CQI and ACK bits are finally determined by selecting the largest metric in stage 2.

Compared with an optimal MLD receiver, an embodiment significantly reduces the complexity with negligible detection performance loss and enables MLD for $N_{CQI}$ greater than seven by reducing the metric computation and search space to ¼ that of full space MLD. Compared with an existing suboptimal algorithm, an embodiment achieves significant performance gain with lower or comparable complexity even when $N_{CQI}$ is less than 9. It can be efficiently implemented in vector DSP processors, or VLSI ASICs, significantly reducing the DSP load by 50% of a joint ML receiver.

Complexity reduction is achieved by dividing the CQI and ACK search spaces into two stages, and selecting M candidates from the first stage, thereby converting the exponential complexity into linear complexity in the second stage. Detection performance is the same as that of optimal MLD by selecting a sufficiently large M (e.g., about four) initial candidates at stage 1 CQI-only detection, with marginal overhead in complexity.

Figure 7:
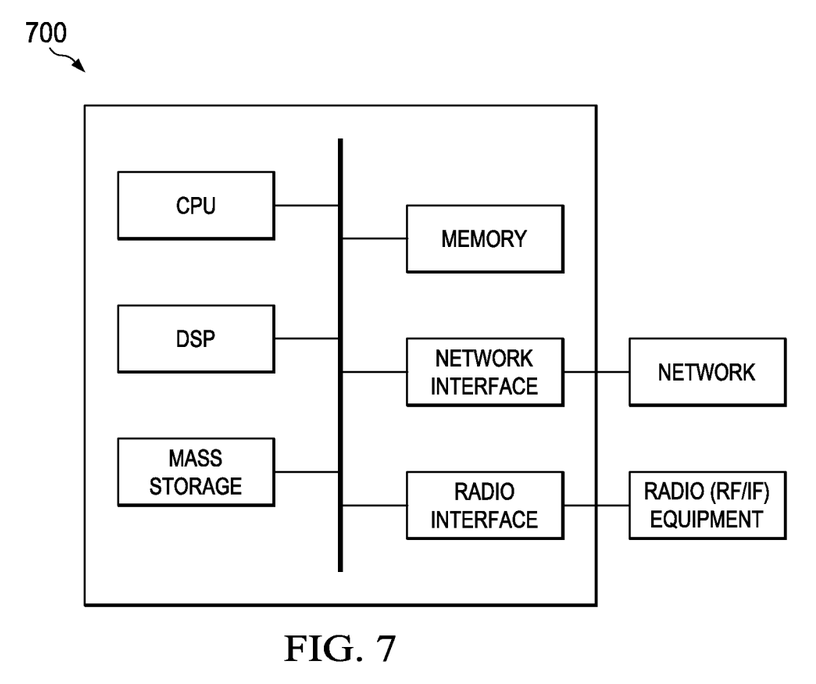
FIG. 7 illustrates a computing platform that may be used for implementing, for example, the devices and methods described herein, in accordance with an embodiment.

FIG. 7 is a block diagram of a processing system 700 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, interfaces to radio and network, etc. The processing system may further comprise a processing unit equipped with one or more input/output devices, such as a speaker, microphone, mouse, touchscreen, keypad, keyboard, printer, display, and the like. Alternatively, the input/output devices may be external devices connected to the processing unit via a link, such as a wired link, a wireless link, or the like. The processing unit may include central processing units (CPU), digital signal processors (DSP), memory, a mass storage device, a video adapter, and an I/O interface connected to a bus.

The bus may be one or more of any type of several bus architectures including a memory bus or memory controller, a peripheral bus, video bus, or the like. The CPU/DSP may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The processing unit includes one or more radio interfaces. This allows the device to communicate with RF/IF equipment, which are located remotely, locally, or integrated in the device. The link between the device and RF/IF equipment may be cable, fiber, or the like. The video adapter and the I/O interface provide interfaces to couple external input and output devices to the processing unit. Examples of input and output devices (not shown) include a display coupled to the video adapter and a mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network communications comprising:
   receiving, by antennas of a base station (BS) from a plurality of user equipments (UEs), a plurality of radio frequency signals;
   converting the plurality of radio frequency signals to a plurality of baseband signals, wherein the plurality of baseband signals comprises a plurality of received channel quality indicator (CQI) symbols and one or more acknowledgement (ACK) symbols;
   selecting, by the BS, a reduced set of candidate CQI symbols by comparing a plurality of candidate CQI symbols with the plurality of received CQI symbols;
   generating, by the BS, a plurality of combinations of candidate CQI and ACK symbols by combining the reduced set of candidate CQI symbols with candidate ACK symbols; and
   detecting, by the BS, the plurality of received CQI symbols and the one or more ACK symbols by comparing the plurality of combinations of candidate CQI and ACK symbols with the plurality of received CQI symbols and the one or more ACK symbols, comprising:
   applying a second metric equation comparing each of the plurality of combinations of candidate CQI and ACK symbols with the plurality of received CQI symbols and the one or more ACK symbols; and
   selecting a candidate CQI and ACK symbol combination from the plurality of candidate CQI symbol and ACK symbol combinations that maximize the second metric equation.

2. The method of claim 1, wherein selecting the reduced set of candidate CQI symbols comprises measuring how close each of the plurality of candidate CQI symbols is to the plurality of received CQI symbols in accordance with a first metric equation, wherein the one or more ACK symbols are not a variable in the first metric equation.

3. The method of claim 2, further comprising:
   receiving, by the BS, one or more pilot symbols; and
   including the one or more pilot symbols in the first metric equation.

4. The method of claim 2, wherein selecting the reduced set of candidate CQI symbols comprises selecting candidate CQI symbols from the plurality of candidate CQI symbols that maximize the first metric equation.

5. The method of claim 1, wherein the plurality of candidate CQI symbols are generated using Reed-Muller (RM) decoding and quadrature phase shift keying (QPSK) mapping of a set of candidate CQI bits.

6. The method of claim 1, wherein the plurality of candidate CQI symbols are generated implicitly using parameters embedded in a first metric equation used to compare the plurality of candidate CQI symbols with the plurality of received CQI symbols.

7. The method of claim 1, wherein selecting the reduced set of candidate CQI symbols comprises selecting four or fewer candidate CQI symbols from the plurality of candidate CQI symbols.

8. The method of claim 1, wherein receiving the plurality of radio frequency signals comprises receiving the plurality of radio frequency signals in accordance with long term evolution (LTE) physical uplink control channel (PUCCH) Format 2a or Format 2b.

9. A base station (BS) comprising:
   antennas, configured to receive, from a plurality of user equipments (UE)s, a plurality of radio frequency signals;
   a processor coupled to the antennas; and
   a non-transitory computer readable storage medium storing programming for execution by the processor, the programming including instructions to:
   convert the plurality of radio frequency signals to a plurality of baseband signals, wherein the plurality of baseband signals comprise a plurality of received channel quality indicator (CQI) symbols and one or more acknowledgement (ACK) symbols;
   select a reduced set of candidate CQI symbols by comparing a plurality of candidate CQI symbols with the plurality of received CQI symbols;
   generate a plurality of combinations of candidate CQI and ACK symbols by combining the reduced set of candidate CQI symbols with candidate ACK symbols; and
   detect the plurality of received CQI symbols and the one or more ACK symbols by comparing the plurality of combinations of candidate CQI and ACK symbols with the plurality of received CQI symbols and the one or more ACK symbols, comprising instructions to:

apply a second metric equation comparing each of the plurality of combinations of candidate CQI and ACK symbols with the plurality of received CQI symbols and the one or more ACK symbols; and select a candidate CQI and ACK symbol combination from the plurality of candidate CQI symbol and ACK symbol combinations that maximize the second metric equation.

10. The BS of claim 9, wherein the reduced set of candidate CQI symbols is limited to four or fewer candidate CQI symbols.

11. The BS of claim 9, wherein the plurality of received CQI symbols and the one or more ACK symbols are received in a physical uplink control channel (PUCCH) in accordance with LTE PUCCH Format 2a or Format 2b.

12. The BS of claim 9, wherein the reduced set of candidate CQI symbols are selected from the plurality of candidate CQI symbols in accordance with a first metric equation calculating how close each of the plurality of candidate CQI symbols is to the plurality of received CQI symbols, and wherein ACK symbols are not a variable in the first metric equation.

13. The BS of claim 12, wherein the plurality of received CQI symbols and the one or more ACK symbols are detected in accordance with a second metric equation calculating how close each of the plurality of combinations of candidate CQI and ACK symbols is to the plurality of received CQI symbols and the one or more ACK symbols.

14. The BS of claim 9, wherein the plurality of received CQI symbols comprise Reed-Muller (RM) encoded and quadrature phase shift keying (QPSK) mapped CQI bits, and wherein the one or more ACK symbols comprise QPSK or binary phase shift keying (BPSK) mapped ACK bits.

15. A method for network control channel element detection comprising:
receiving, by antennas of a base station (BS) from a user equipment (UE), a radio frequency signal;
converting the radio frequency signal to a baseband signal, wherein the baseband signal comprises a physical uplink control channel (PUCCH) comprising: channel quality indicator (CQI) symbols and one or more acknowledgement (ACK) symbols; and
detecting, by the BS, CQI bits contained in the CQI symbols and ACK bits contained in the one or more ACK symbols using a two-stage maximum likelihood detection (MLD) method, wherein the two-stage MLD method comprises:
selecting, in a first stage of the two-stage MLD method, an M-list of candidate CQI symbols in accordance with a first metric, wherein a first search space of the first stage comprises only candidate CQI symbols; and
detecting, in a second stage of the two-stage MLD method, the CQI bits and the ACK bits in accordance with a second metric, wherein a second search space of the second stage comprises a plurality of candidate CQI and ACK symbol combinations, and wherein each of the plurality of candidate CQI and ACK symbol combinations comprises candidate CQI symbols from the M-list of candidate CQI symbols combined with a candidate ACK symbol.

16. The method of claim 15, wherein the first metric measures how close each of the candidate CQI symbols are to the CQI symbols received by the BS.

17. The method of claim 15, wherein the second metric measures how close each of the candidate CQI and ACK symbol combinations are to the CQI symbols and the one or more ACK symbols received by the BS.

18. The method of claim 15, wherein selecting the M-list of candidate CQI symbols comprises selecting four or fewer candidate CQI symbols.

19. The method of claim 15, wherein the first stage of the two-stage MLD method further comprises explicitly generating the candidate CQI symbols by Reed-Muller (RM) encoding and quadrature phase shift keying (QPSK) mapping candidate CQI bits.

20. The method of claim 15, wherein the PUCCH is in accordance with long term evolution (LTE) PUCCH Format 2a or Format 2b.

21. The method of claim 15 further comprising processing the PUCCH before detecting the CQI bits contained in the CQI symbols and the ACK bits contained in the one or more ACK symbols.

22. The method of claim 21, wherein the PUCCH comprises uplink control data from a plurality of BSs, wherein the uplink control data from each of the plurality of BSs comprises CQI symbols and one or more ACK symbols, and wherein processing the PUCCH further comprises separating the uplink control data from each of the plurality of BSs in accordance with BS-specific sequences.

* * * * *